US012789778B2

(12) United States Patent
Hakiai et al.

(10) Patent No.: US 12,789,778 B2
(45) Date of Patent: Nov. 10, 2026

(54) BRAKE HYDRAULIC PRESSURE CONTROL DEVICE AND BRAKE SYSTEM

(71) Applicant: Robert Bosch GmbH, Stuttgart (DE)

(72) Inventors: Motomu Hakiai, Kanagawa (JP); Majooran Rajaratnam, Abstatt (DE); Tanja Reiber, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 18/698,072

(22) PCT Filed: Oct. 4, 2022

(86) PCT No.: PCT/IB2022/059445

§ 371 (c)(1),
(2) Date: Apr. 3, 2024

(87) PCT Pub. No.: WO2023/057886

PCT Pub. Date: Apr. 13, 2023

(65) Prior Publication Data

US 2024/0400025 A1 Dec. 5, 2024

(30) Foreign Application Priority Data

Oct. 5, 2021 (JP) ................................ 2021-164288

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/4081* (2013.01); *B60T 13/686* (2013.01); *B60T 2220/04* (2013.01)

(58) Field of Classification Search
CPC ...... B60T 13/745; B60T 7/042; B60T 8/3255; B60T 8/4081; B60T 13/146;
(Continued)

(56) References Cited

U.S. PATENT DOCUMENTS 10,144,404 B2 * 12/2018 Irwan ...................... B60T 7/042
2012/0112525 A1 * 5/2012 Shimada .............. B60T 8/4081 303/10

(Continued)

FOREIGN PATENT DOCUMENTS

DE 102017111077 A1 11/2018
DE 102017220308 A1 5/2019

(Continued)

OTHER PUBLICATIONS

International Search Report and Written Opinion for Application No. PCT/IB2022/059445 dated Dec. 20, 2022 (10 pages).

*Primary Examiner* — Pamela Rodriguez
(74) *Attorney, Agent, or Firm* — Michael Best & Friedrich LLP

(57) ABSTRACT

Provided are a brake hydraulic pressure control device and a brake system capable of generating a desired brake pressure even in a state in which a brake fluid does not easily return from a stroke simulator device to a master cylinder. In a brake system (1) including a reservoir (31), a master cylinder (10), a stroke simulator device (40), a fluid pressure control unit (60), and a brake hydraulic pressure control device (100), the brake hydraulic pressure control device (100) acquires an imaginary stroke amount (St_est) of an input rod (5) on the basis of a pressure value (P_MC) detected by a pressure sensor (41) and controls a brake pressure (P_WC) on the basis of the imaginary stroke amount (St_est).

5 Claims, 4 Drawing Sheets

(51) Int. Cl.
*B60T 8/40* (2006.01)
*B60T 13/68* (2006.01)

(58) Field of Classification Search
CPC .. B60T 13/662; B60T 13/686; B60T 2220/04; B60Y 2400/81
See application file for complete search history.

(56) References Cited

U.S. PATENT DOCUMENTS

| | | | | |
|---|---|---|---|---|
| 2012/0151914 | A1* | 6/2012 | Nishioka | B60T 7/042 60/545 |
| 2018/0015912 | A1 | 1/2018 | Foitzik et al. | |
| 2018/0339690 | A1 | 11/2018 | Kim et al. | |
| 2019/0337498 | A1 | 11/2019 | Jung | |
| 2020/0047734 | A1 | 2/2020 | Foitzik et al. | |
| 2022/0009460 | A1* | 1/2022 | Nishiura | B60T 13/662 |

FOREIGN PATENT DOCUMENTS

| | | | |
|---|---|---|---|
| DE | 102020202367 | A1 | 8/2021 |
| EP | 2671769 | A1 | 12/2013 |
| EP | 3333031 | A1 | 6/2018 |
| EP | 3461705 | A1 | 4/2019 |
| JP | 2014094625 | A | 5/2014 |
| JP | 2019147442 | A | 9/2019 |
| KR | 20140083398 | A | 7/2014 |
| WO | 2019011858 | A1 | 1/2019 |
| WO | 2019195542 | A1 | 10/2019 |

* cited by examiner

[FIG. 1]
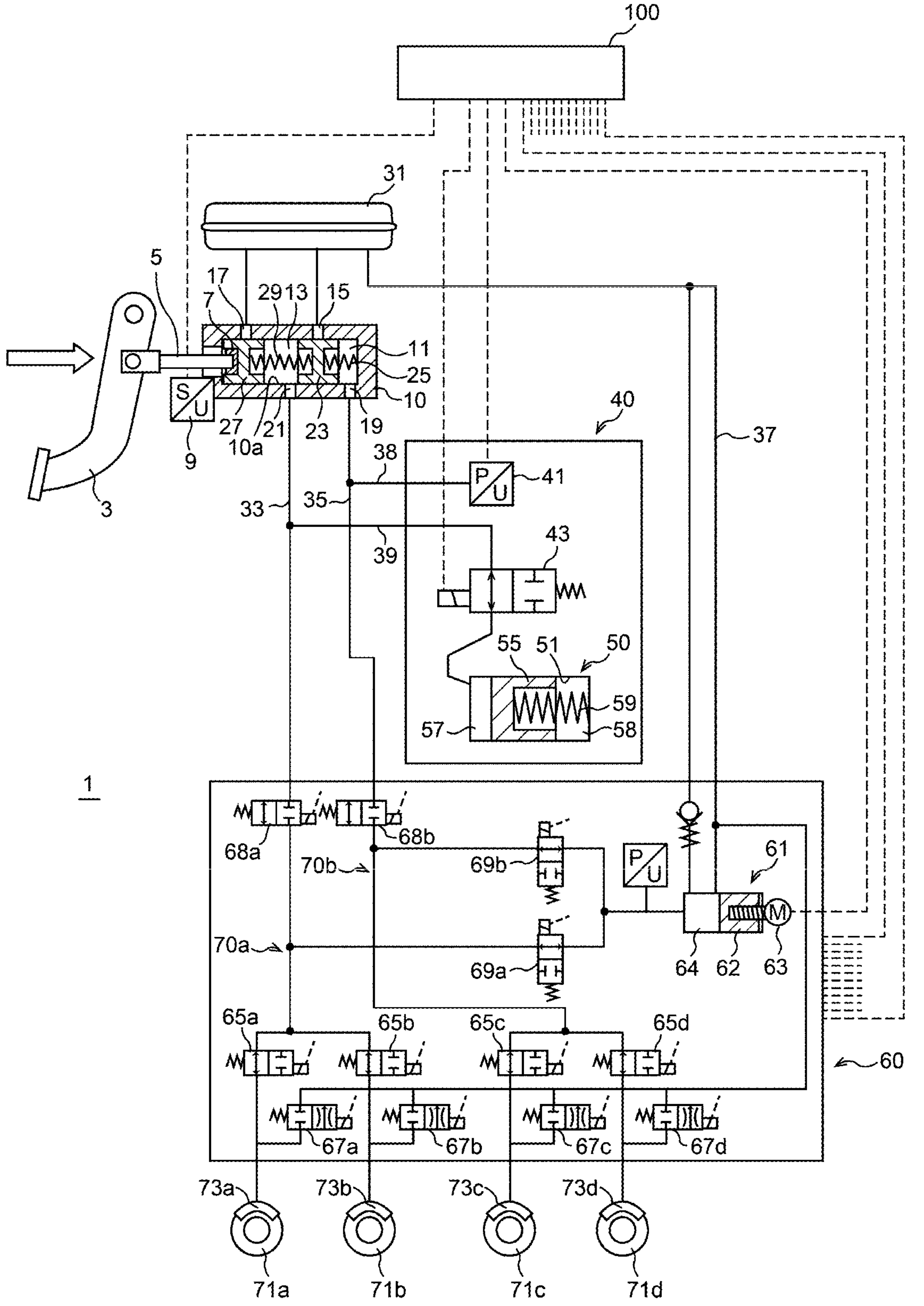

[FIG. 2]
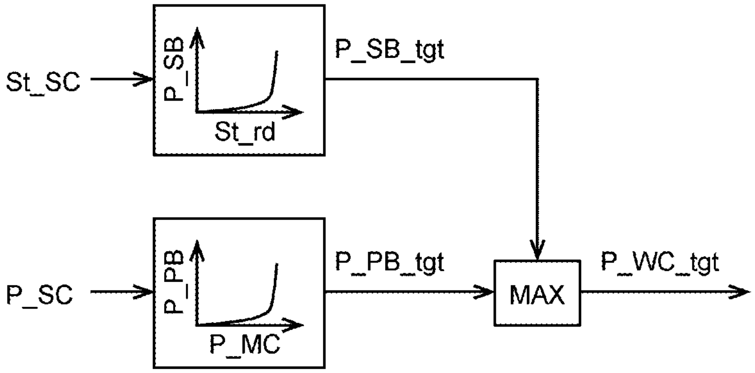
[FIG. 3]
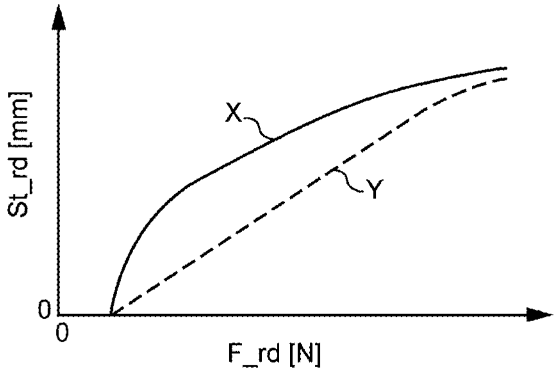
[FIG. 4]
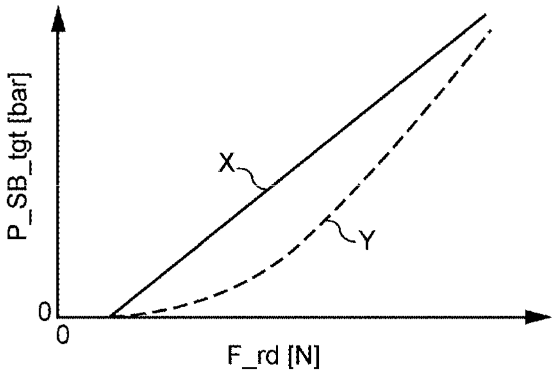

[FIG. 5]
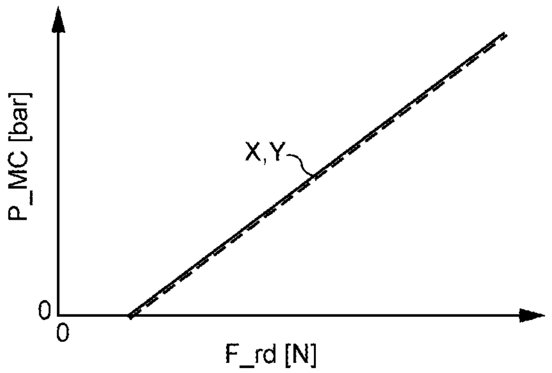
[FIG. 6]
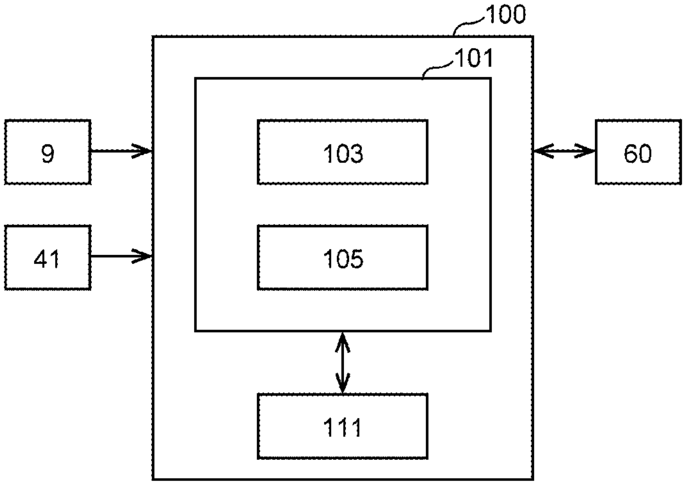

[FIG. 7]
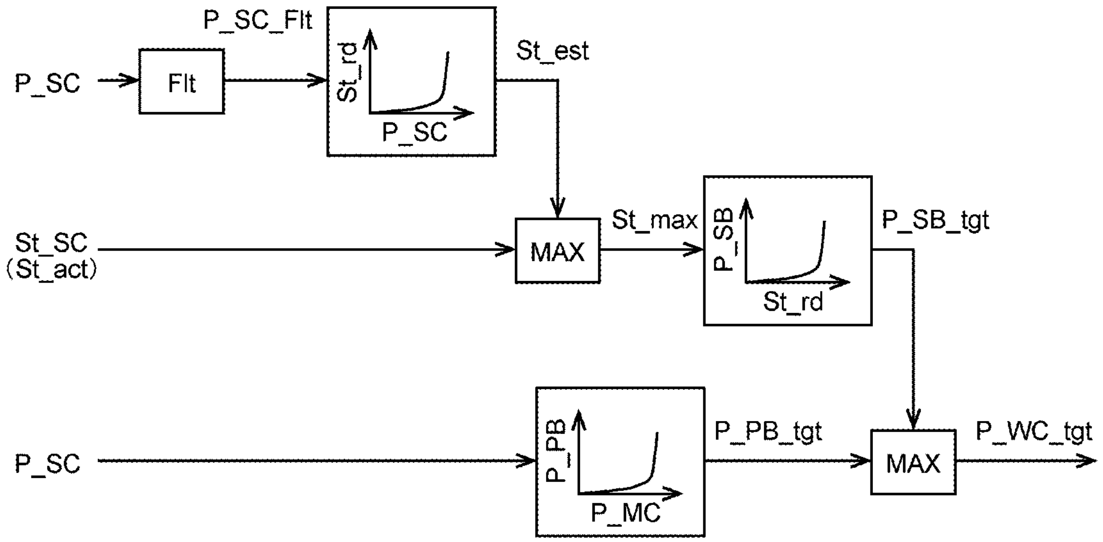
[FIG. 8]
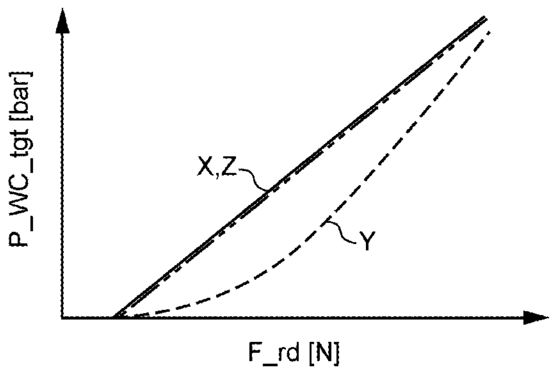

BRAKE HYDRAULIC PRESSURE CONTROL DEVICE AND BRAKE SYSTEM

BACKGROUND

The present invention relates to a brake hydraulic pressure control device and a brake system.

A brake system mounted to a vehicle is configured as a hydraulic brake system which generally supplies a hydraulic pressure from a master cylinder to a wheel cylinder to generate a brake pressure. Further, in order to enable an automatic operation and automatic emergency braking of the vehicle, the brake system is provided with a fluid pressure control unit which controls a brake pressure generated in the wheel cylinder. In recent years, a so-called brake-by-wire system has been put into practical use in which a sensor detects an operation amount of a brake pedal and a brake hydraulic pressure control device controls a fluid pressure control unit on the basis of the detected operation amount to generate a desired brake pressure in the wheel cylinder.

This brake-by-wire system is a system which generates a brake pressure by supplying a brake fluid from a reservoir tank to a wheel cylinder in such a manner that a brake hydraulic pressure control device controls a fluid pressure control unit on the basis of a physical quantity that reflects a driver's operation amount of a brake pedal instead of supplying a fluid pressure generated inside a master cylinder when the driver depresses the brake pedal to the wheel cylinder. The brake-by-wire system is provided with a stroke simulator device which generates a reaction force to the brake pedal by adding a fluid pressure generated in the master cylinder to give the driver the same operating feeling as a conventional brake system (for example, see JP2019147442A).

In the brake-by-wire system shown in JP2019147442A, a target value of the brake pressure is generally set on the basis of the stroke amount of the input rod moving forward and backward in accordance with the operation amount of the brake pedal while being connected to the piston of the master cylinder as the physical quantity that reflects the operation amount of the brake pedal. However, for example, when the viscosity of the brake fluid increases at a low temperature and the resistance of the flow of the brake fluid increases, a normal stroke amount cannot be obtained even when the driver depresses the brake pedal and a delay occurs until a desired brake force is obtained. Thus, there is a risk that a relationship between the operation amount of the brake pedal and the pedal force applied to the brake pedal by the driver changes and a desired brake pressure cannot be generated.

SUMMARY

An object of the invention is to provide a brake hydraulic pressure control device and a brake system capable of generating a desired brake pressure even when a brake fluid does not easily flow from a master cylinder to a stroke simulator device.

In order to solve the above-described problem, according to an aspect of the invention, there is provided a brake hydraulic pressure control device for controlling a brake system including a reservoir which stores a brake fluid, a master cylinder which has a fluid pressure chamber connected to the reservoir and generates a fluid pressure in accordance with the movement of an input rod connected to a brake pedal, a stroke simulator device which receives a fluid pressure generated by the master cylinder and generates a reaction force to the brake pedal, a sensor which detects a stroke amount of the input rod, a pressure sensor which detects the fluid pressure generated by the master cylinder, and a fluid pressure control unit which adjusts a brake pressure generated in a wheel cylinder, and the brake hydraulic pressure control device obtains an imaginary stroke amount on the basis of a pressure value detected by the pressure sensor and controls a brake pressure on the basis of the imaginary stroke amount.

Further, in order to solve the above-described problem, according to another aspect of the invention, there is provided a brake system including: a reservoir which stores a brake fluid; a master cylinder which has a fluid pressure chamber connected to the reservoir and generates a fluid pressure in accordance with the movement of an input rod connected to a brake pedal; a stroke simulator device which receives a fluid pressure generated by the master cylinder and generates a reaction force to the brake pedal; a sensor which detects a stroke amount of the input rod; a pressure sensor which detects the fluid pressure generated by the master cylinder; a fluid pressure control unit which adjusts a brake pressure generated in a wheel cylinder; and a brake hydraulic pressure control device which controls the brake pressure on the basis of the stroke amount of the input rod, and the brake hydraulic pressure control device obtains an imaginary stroke amount on the basis of a pressure value detected by the pressure sensor and controls a brake pressure on the basis of the imaginary stroke amount.

As described above, according to the invention, it is possible to generate a desired brake pressure even when a brake fluid does not easily flow from a master cylinder to a stroke simulator device.

BRIEF DESCRIPTION OF DRAWINGS

FIG. 1 is a schematic view showing a configuration example of a brake system according to an embodiment of the invention.

FIG. 2 is an explanatory diagram showing a reference example of a brake pressure control process that does not take into account a state in which a brake fluid does not easily flow from a master cylinder to a stroke simulator device.

FIG. 3 is an explanatory diagram showing a relationship between a pedal force and a stroke amount according to a reference example.

FIG. 4 is an explanatory diagram showing a relationship between a pedal force and a target brake pressure according to a reference example.

FIG. 5 is an explanatory diagram showing a relationship between a pedal force and a master cylinder pressure according to a reference example.

FIG. 6 is a block diagram showing a configuration example of a brake hydraulic pressure control device according to this embodiment.

FIG. 7 is an explanatory diagram showing arithmetic logic of a process for setting a target brake pressure by the brake system according to this embodiment.

FIG. 8 is an explanatory diagram illustrating an operation of the brake system according to this embodiment.

DETAILED DESCRIPTION

Preferred embodiments of the invention will be described in detail below with reference to the accompanying drawings. Additionally, in the present specification and drawings, constituent elements having substantially the same functional configuration are denoted by the same reference numerals and redundant description is omitted.

1. Configuration Example of Brake System

First, a configuration example of a brake system according to this embodiment will be described.

FIG. 1 is a schematic view showing a configuration example of the brake system according to this embodiment. Although a brake system 1 shown in FIG. 1 is configured as a brake system for a four-wheeled vehicle, the brake system may be a brake system for other vehicles having drive wheels, such as a two-wheeled vehicle.

The brake system 1 includes a master cylinder 10, a stroke simulator device 40, a fluid pressure control unit 60, and a brake hydraulic pressure control device 100. The stroke simulator device 40 and the fluid pressure control unit 60 may be configured separately or integrally. A part or all of the brake hydraulic pressure control device 100 includes one or more arithmetic processing units such as a CPU (Central Processing Unit). A part or all of the brake hydraulic pressure control device 100 may be composed of an updateable device such as firmware or may be a program module or the like executed by a command from a CPU or the like. The brake hydraulic pressure control device 100 may be composed of a plurality of control devices that are communicatively connected to each other.

Master Cylinder)

A bore 10*a* which extends in the axial direction is formed inside the master cylinder 10. A reservoir 31 which stores a brake fluid is attached to the upper portion of the master cylinder 10. The reservoir 31 is connected to the bore 10*a* inside the master cylinder 10 through two supply ports 15 and 17 and can supply the brake fluid stored inside the reservoir 31 into the master cylinder 10. A primary piston 27 and a secondary piston 23 are arranged inside the bore 10*a* to be slidable in the axial direction. The bore 10*a* is defined by the primary piston 27 and the secondary piston 23 to form a primary chamber 13 and a secondary chamber 11 which are two fluid pressure chambers. A first spring 29 which is disposed between the primary piston 27 and the secondary piston 23 is provided in the primary chamber 13. A second spring 25 which is disposed between the secondary piston 23 and the end surface of the bore 10*a* is provided in the secondary chamber 11.

The input rod 5 is connected to the primary piston 27 through a coupler 7. The input rod 5 is connected to a brake pedal 3 and moves forward and backward in accordance with the driver's operation of the brake pedal 3. The primary piston 27 and the secondary piston 23 are respectively urged toward the brake pedal 3 by the urging forces of the first spring 29 and the second spring 25. A fluid pressure generated inside the primary chamber 13 and a fluid pressure generated inside the secondary chamber 11 are the same pressure. When the driver depresses the brake pedal 3, the primary piston 27 and the secondary piston 23 are pressed against the urging forces of the first spring 29 and the second spring 25 to pressurize the brake fluid stored in the primary chamber 13 and the secondary chamber 11.

The master cylinder 10 is provided with a stroke sensor 9 for detecting the forward/backward movement amount (stroke amount) of the input rod 5. A sensor signal of the stroke sensor 9 is transmitted to the brake hydraulic pressure control device 100. The stroke sensor 9 is a displacement sensor which detects the relative displacement amount of the input rod 5 with respect to the master cylinder 10. The stroke sensor 9 may be, for example, a magnetic displacement sensor that outputs a current having a magnitude corresponding to changes in the magnetic field to the brake hydraulic pressure control device 100, but the type of sensor is not particularly limited. Additionally, the sensor for detecting the stroke amount of the input rod 5 is not limited to the stroke sensor 9. For example, the sensor may be an angle sensor which detects the rotation angle of the brake pedal 3. In this case, the rotation angle of the brake pedal 3 is converted into the stroke amount of the input rod 5 by the brake hydraulic pressure control device 100.

Fluid Pressure Control Unit)

The fluid pressure control unit 60 adjusts the brake pressure generated in wheel cylinders 73*a* to 73*d* respectively provided in vehicle wheels 71*a* to 71*d*. In this embodiment, the fluid pressure control unit 60 is composed of a hydraulic circuit including a piston cylinder unit 61 and a plurality of control valves and supplies the brake fluid to the wheel cylinders 73*a* to 73*d* to generate the brake pressure in each of the vehicle wheels 71*a* to 71*d*.

The fluid pressure control unit 60 includes a first fluid pressure circuit 70*a* and a second fluid pressure circuit 70*b*. The first fluid pressure circuit 70*a* is connected to a first communication path 33 communicating with the primary chamber 13 through a connection port 21 of the master cylinder 10 and supplies a brake fluid to the wheel cylinders 73*a* and 73*b* of two vehicle wheels 71*a* and 71*b*. Further, the second fluid pressure circuit 70*b* is connected to a second communication path 35 communicating with the secondary chamber 11 through a connection port 19 of the master cylinder 10 and supplies a brake fluid to wheel cylinders 73*c* and 73*d* of two vehicle wheels 71*c* and 71*d*. The first communication path 33 and the second communication path 35 are respectively provided with circuit switching valves 68*a* and 68*b* and the first fluid pressure circuit 70*a* and the second fluid pressure circuit 70*b* are respectively separable from the primary chamber 13 and the secondary chamber 11.

Further, a supply passage 37 which communicates with the reservoir 31 is connected to each of the first fluid pressure circuit 70*a* and the second fluid pressure circuit 70*b*. The piston cylinder unit 61 is provided in the middle of the supply passage 37. The piston cylinder unit 61 includes an electric motor 63 which is an actuator and a piston 62 which is moved forward and backward inside a cylinder 64 by the driving of the electric motor 63. The piston cylinder unit 61 adjusts the fluid pressure applied to each of the wheel cylinders 73*a* to 73*d* through the first fluid pressure circuit 70*a* and the second fluid pressure circuit 70*b* by displacing the position of the piston 62 by the driving of the electric motor 63. Shutoff valves 69*a* and 69*b* are respectively provided between the piston cylinder unit 61 and the first fluid pressure circuit 70*a* and between the piston cylinder unit 61 and the second fluid pressure circuit 70*b* and each of the first fluid pressure circuit 70*a* and the second fluid pressure circuit 70*b* is separable from the supply passage 37.

The first fluid pressure circuit 70*a* and the second fluid pressure circuit 70*b* are provided with pressure increasing valves 65*a* to 65*d* which can supply the brake fluid to each of the wheel cylinders 73*a* to 73*d* and pressure decreasing valves 67*a* to 67*d* which exhaust the brake fluid from each of the wheel cylinders 73*a* to 73*d* in order to correspond to the vehicle wheels 71*a* to 71*d*.

The brake system 1 according to this embodiment is configured as a so-called brake-by-wire system. Therefore, in a normal brake control mode (normal mode), the circuit switching valves 68*a* and 68*b* are closed so that the communication between the primary chamber 13 and the secondary chamber 11 of the master cylinder 10 and the wheel cylinders 73*a* to 73*d* is blocked and the shutoff valves 69*a* and 69*b* are opened so that the fluid pressure can be supplied to the wheel cylinders 73*a* to 73*d* by the piston cylinder unit 61 (a state shown in FIG. 1). In the normal mode, the brake hydraulic pressure control device 100 controls the piston cylinder unit 61, the pressure increasing valves 65*a* to 65*d*, and the pressure decreasing valves 67*a* to 67*d* to control the fluid pressure of each of the wheel cylinders 73*a* to 73*d*. In the normal mode, the brake hydraulic pressure control device 100 controls the driving of the fluid pressure control unit 60 on the basis of the physical quantity that reflects the amount of brake pedal operation by the driver so that a desired brake pressure is generated in each of the vehicle wheels 71*a* to 71*d*. The brake pressure control process by the brake hydraulic pressure control device 100 will be described below in detail.

Further, when it is difficult to control the brake pressure by the brake hydraulic pressure control device 100 such as when the brake system 1 is abnormal, the circuit switching valves 68*a* and 68*b* are opened so that the primary chamber 13 and the secondary chamber 11 of the master cylinder 10 communicate with the wheel cylinders 73*a* to 73*d* and the shutoff valves 69*a* and 69*b* are closed so that the fluid pressure cannot be supplied to the wheel cylinders 73*a* to 73*d* by the piston cylinder unit 61 (failsafe mode). In the failsafe mode, the fluid pressure generated in the primary chamber 13 and the secondary chamber 11 in accordance with the operation amount of the brake pedal 3 is supplied to the wheel cylinders 73*a* to 73*d* of each of the vehicle wheels 71*a* to 71*d* through the first fluid pressure circuit 70*a* and the second fluid pressure circuit 70*b* so that the brake pressure is generated in each of the vehicle wheels 71*a* to 71*d*.

Additionally, in the brake system 1 configured as the brake-by-wire system, the circuit switching valves 68*a* and 68*b* and the pressure increasing valves 65*a* to 65*d* are normally open valves, the shutoff valves 69*a* and 69*b* and the pressure decreasing valves 67*a* to 67*d* are normally closed valves, and these are configured to switch to the failsafe mode when power is lost.

Stroke Simulator Device)

The stroke simulator device 40 includes a pressure sensor 41, an open/close control valve 43, and a reaction force generation unit 50. The pressure sensor 41 is connected to the second communication path 35 communicating with the secondary chamber 11 of the master cylinder 10 through the connection passage 38. The pressure sensor 41 detects the fluid pressure (hereinafter, referred to as the "master cylinder pressure") generated in the master cylinder 10 even when the brake control mode is the normal mode or the failsafe mode. The sensor signal of the pressure sensor 41 is transmitted to the brake hydraulic pressure control device 100. In this embodiment, the pressure sensor 41 which outputs a voltage signal according to a pressure value is used, but the type of the pressure sensor 41 is not particularly limited.

The reaction force generation unit 50 is connected to the first communication path 33 communicating with the primary chamber 13 of the master cylinder 10 through the connection passage 39. The reaction force generation unit 50 includes a piston 55 which is disposed to be slidable inside the piston slide hole 51 in the axial direction. The piston slide hole 51 is defined by the piston 55 to form a pressure chamber 57 and a spring chamber 58. The spring chamber 58 is provided with a spring 59 which is disposed between the piston 55 and the end surface of the piston slide hole 51 and can urge the piston 55 toward the pressure chamber 57. The pressure chamber 57 is connected to the primary chamber 13 of the master cylinder 10 through the connection passage 39 and the first communication path 33.

The open/close control valve 43 is provided in the middle of the connection passage 39 and switches the communication or the interruption between the primary chamber 13 and the pressure chamber 57 of the reaction force generation unit 50. The driving of the open/close control valve 43 is controlled by the brake hydraulic pressure control device 100. The open/close control valve 43 is kept open at least when the stroke of the input rod 5 is detected and is switched to a closed state when an abnormality occurs in the brake system 1 or the stroke simulator device 40, for example.

When the driver depresses the brake pedal 3, the brake fluid inside the primary chamber 13 and the secondary chamber 11 is pressurized to generate the fluid pressure inside the primary chamber 13 and the secondary chamber 11. The value of the fluid pressure generated inside the master cylinder 10 is detected by the pressure sensor 41 and the sensor signal of the pressure sensor 41 is transmitted to the brake hydraulic pressure control device 100. Further, the fluid pressure generated inside the master cylinder 10 is applied to the pressure chamber 57 of the reaction force generation unit 50 and presses the piston 55 against the urging force of the spring 59. Accordingly, a reaction force to the brake pedal 3 is generated. At this time, since the urging force of the spring 59 increases as the movement amount of the piston 55 in the compressing direction of the spring 59 increases, the driver who operates the brake pedal 3 can obtain an operating feeling equivalent to that of a conventional brake system that supplies the fluid pressure generated in the master cylinder to the wheel cylinders.

Brake Hydraulic Pressure Control Device)

When the brake control is performed in the normal mode, the brake hydraulic pressure control device 100 controls the driving of the fluid pressure control unit 60 on the basis of the physical quantity that reflects the operation amount of brake pedal 3 to generate a desired brake pressure in each of the vehicle wheels 71*a* to 71*d*. The brake hydraulic pressure control device 100 controls the brake system 1 so that a desired brake pressure can be generated as the brake-by-wire system even in a state in which the brake fluid does not easily flow from the master cylinder 10 to the stroke simulator device 40.

Hereinafter, the configuration and operation of the brake hydraulic pressure control device 100 will be described in detail after the problems to be solved by the technology of the present disclosure are described in detail.

2. Details of Issue

As described above, in the brake system 1 according to this embodiment, a phenomenon occurs in which the brake fluid becomes difficult to flow from the master cylinder 10 to the stroke simulator device 40 if the fluidity of the brake fluid decreases such as when the outside temperature is low and the viscosity of the brake fluid is high. This phenomenon becomes more conspicuous as the length of the fluid pressure path between the master cylinder 10 and the stroke simulator device 40 becomes longer and the diameter of the fluid pressure path between the master cylinder 10 and the stroke simulator device 40 becomes smaller.

Further, when the sliding resistance of the piston 55 is large due to the entry of foreign matter into the sliding portion of the piston 55 provided in the reaction force generation unit 50 for generating the reaction force of the brake pedal 3 in the stroke simulator device 40 even at times other than the low temperature, the operation of the piston 55 becomes dull and the brake fluid does not easily flow from the master cylinder 10 to the reaction force generation unit 50. Further, when an abnormality such as clogging or malfunction occurs in the open/close control valve 43 provided in the brake fluid path between the master cylinder 10 and the reaction force generation unit 50, the diameter of the path becomes narrow and the brake fluid does not easily flow from the master cylinder 10 to the reaction force generation unit 50. Therefore, there is a risk that a desired brake pressure cannot be generated when a relationship between the pedal force applied to the brake pedal 3 by the driver and the operation amount of the brake pedal 3 changes and the fluid pressure control unit 60 is controlled on the basis of the predetermined physical quantity that reflects the operation amount of brake pedal 3.

FIG. 2 is an explanatory diagram showing a reference example of a brake pressure control process that does not take into account a state in which the brake fluid does not easily flow from the master cylinder 10 to the stroke simulator device 40 and shows a calculation logic of target brake pressure (wheel cylinder pressure) P_WC to be generated in the wheel cylinders 73*a* to 73*d* of each of the vehicle wheels 71*a* to 71*d*. In the control process of the reference example shown in FIG. 2, the information of the stroke amount (detection stroke amount) of the input rod 5 detected by the stroke sensor 9 and the information of the fluid pressure detected by the pressure sensor 41 are used as the physical quantity that reflects the operation amount of brake pedal 3.

Specifically, the brake hydraulic pressure control device acquires a sensor signal P_SC of the pressure sensor 41 and obtains a fluid pressure base target brake pressure P_PB_tgt in the case of the calculation based on the fluid pressure by referring to preset map data of a fluid pressure-brake pressure characteristic indicating a relationship between a fluid pressure (hereinafter, referred to as a "master cylinder pressure") P_MC generated inside the master cylinder 10 and a brake pressure P_PB to be generated. Further, the brake hydraulic pressure control device acquires a sensor signal St_SC of the stroke sensor 9 and obtains a stroke base target brake pressure P_SB_tgt in the case of the calculation based on the stroke amount by referring to preset map data of a stroke-brake pressure characteristic indicating a relationship between a stroke amount St_rd and a brake pressure P_SB to be generated. Then, the brake hydraulic pressure control device 100 compares the fluid pressure base target brake pressure P_PB_tgt and the stroke base target brake pressure P_SB_tgt and sets the larger one as a target brake pressure P_WC_tgt.

As the characteristic of the stroke simulator device 40, in an area in which the brake pedal 3 starts to be depressed, the increase speed of the master cylinder pressure P_MC with respect to the increase of the stroke amount St_rd is slow and the target brake pressure P_WC_tgt is not easily set on the basis of the fluid pressure. On the other hand, in an area in which the brake pedal 3 is deeply depressed, the change of the stroke amount St_rd with respect to the increase of the master cylinder pressure P_MC is small and the stroke amount base target brake pressure P_WC_tgt may not be easily set. Therefore, in the control process of the reference example, the fluid pressure base target brake amount P_PB and the stroke base target brake amount P_SB are respectively obtained and the larger one is set as the target brake pressure P_WC_tgt in consideration of the safety risk.

FIGS. 3 to 5 are explanatory diagrams showing characteristics at a normal temperature and a low temperature respectively when the brake pedal 3 is depressed at a predetermined depression speed. FIG. 3 is an explanatory diagram illustrating a relationship between a pedal force F_rd (N) applied to the input rod 5 through the brake pedal 3 and a stroke amount St_rd (mm) of the input rod 5. FIG. 4 is an explanatory diagram illustrating a relationship between the pedal force F_rd (N) applied to the input rod 5 through the brake pedal 3 and the set target brake pressure P_WC_tgt. FIG. 5 is an explanatory diagram showing a relationship between the pedal force F_rd (N) applied to the input rod 5 through the brake pedal 3 and the master cylinder pressure P_MC. In FIGS. 3 to 5, a solid line X indicates the characteristics at a normal temperature, and a dashed line Y indicates the characteristics at a low temperature.

The characteristics when the brake pedal 3 is depressed at a normal temperature show the characteristics (basic characteristics) when the brake fluid in the master cylinder 10 smoothly flows to the stroke simulator device 40. However, since the viscosity of the brake fluid in the path from the master cylinder 10 to the stroke simulator device 40 increases at a low temperature, the movement of the brake fluid in the path may be hindered. In such a case, the stroke amount St_rd becomes smaller than the basic characteristic even at the same pedal force F_rd (see FIG. 3).

Further, since the stroke amount St_rd at a low temperature with respect to the pedal force F_rd applied to the input rod 5 becomes smaller than the basic characteristic at a normal temperature, the stroke base target brake pressure P_MC obtained based on the stroke amount St_rd becomes smaller than the basic characteristic even at the same pedal force F_rd (see FIG. 4).

Additionally, as shown in FIG. 5, it can be seen that a relationship between the pedal force F_rd applied to the input rod 5 and the master cylinder pressure P_MC does not change from the basic characteristics in the normal state even when the movement of the brake fluid is hindered in the path from the master cylinder 10 to the stroke simulator device 40.

In the brake system 1 according to this embodiment, a desired brake pressure is generated by the driver's operation of the brake pedal 3 even when the brake fluid does not easily flow from the master cylinder 10 into the stroke simulator device 40.

3. Brake Hydraulic Pressure Control Device

Next, the brake hydraulic pressure control device 100 according to this embodiment will be described in detail.

3-1. Configuration Example

FIG. 6 is a block diagram showing a configuration example of the brake hydraulic pressure control device 100. The brake hydraulic pressure control device 100 includes a processing unit 101 configured as one or a plurality of arithmetic processing units such as CPUs and a storage unit 111 communicably connected to the processing unit 101. The storage unit 111 is configured as a storage element such as a RAM (Random Access Memory) or a ROM (Read Only Memory) or one or a plurality of storage media such as an SSD (Solid State Drive), an HDD (Hard Disk Drive), and a CD-ROM. The storage unit 111 stores a computer program executed by the processing unit 101 or various parameters, map data, acquired data, calculation result, and the like used for a calculation process.

The processing unit 101 includes a target brake pressure setting unit 103 and a brake pressure control unit 105. The target brake pressure setting unit 103 and the brake pressure control unit 105 are functions realized by execution of a computer program by a CPU or the like, but a part of them may be configured as an analog circuit.

(Target Brake Pressure Setting Unit)

The target brake pressure setting unit 103 performs a process for setting the target brake pressure P_WC_tgt generated in each of the vehicle wheels 71*a* to 71*d* on the basis of the physical quantity that reflects the operation amount of brake pedal 3 operated by the driver. In the brake system 1 according to this embodiment, the information of the stroke amount St_rd of the input rod 5 detected by the stroke sensor 9 and the information of the fluid pressure (master cylinder pressure) P_MC generated inside the master cylinder 10 are used as the physical quantity that reflects the operation amount of brake pedal 3 operated by the driver.

(Brake Pressure Control Unit)

The brake pressure control unit 105 controls the brake pressure generated in each of the vehicle wheels 71*a* to 71*d* by controlling the driving of the control valve and the piston cylinder unit 61 provided in the fluid pressure control unit 60 on the basis of the target brake pressure P_WC_tgt set in the target brake pressure setting unit 103. For example, the brake pressure control unit 105 supplies the brake liquid to the wheel cylinders 73*a* to 73*d* of the vehicle wheels 71*a* to 71*d* by driving the piston cylinder unit 61 while opening the pressure increasing valves 65*a* to 65*d* and adjusts the brake pressure generated in each of the vehicle wheels 71*a* to 71*d* by controlling the opening degrees of the pressure decreasing valves 67*a* to 67*d*. Since the control method of the fluid pressure control unit 60 based on the target brake pressure P_WC_tgt is the same as the conventional control method, detailed description will be omitted.

3-2. Target Brake Pressure Setting Process Operation

Next, the setting process operation of the target brake pressure P_WC_tgt performed by the target brake pressure setting unit 103 will be described in detail.

FIG. 7 shows arithmetic logic of a process for setting the target brake pressure P_WC_tgt by the target brake pressure setting unit 103. The arithmetic logic shown in FIG. 7 differs from the arithmetic logic shown in FIG. 2 in the method of calculating the stroke base target brake pressure P_SB_tgt. Even in this embodiment, the information of the stroke amount (detection stroke amount) St_rd of the input rod 5 detected by the stroke sensor 9 and the information of a fluid pressure P_MC detected by the pressure sensor 41 are used as the physical quantity that reflects the operation amount of brake pedal 3.

The target brake pressure setting unit 103 obtains the fluid pressure base target brake pressure P_PB_tgt by the calculation similarly to the arithmetic logic shown in FIG. 2. Specifically, the target brake pressure setting unit 103 acquires the sensor signal P_SC of the pressure sensor 41 and obtains the fluid pressure base target brake pressure P_PB_tgt by referring to the preset map data of the fluid pressure-brake pressure characteristic indicating a relationship between the fluid pressure P_MC generated inside the master cylinder 10 and the brake pressure P_PB to be generated.

Further, the target brake pressure setting unit 103 obtains the stroke base target brake pressure P_SB_tgt by calculation using the information of the detection stroke amount St_rd of the input rod 5 detected by the stroke sensor 9 and the information of the fluid pressure P_MC detected by the pressure sensor 41.

Specifically, the target brake pressure setting unit 103 acquires the sensor signal P_SC of the pressure sensor 41 and performs a filtering process on the sensor signal P_SC. Since the fluid pressure P_MC generated inside the master cylinder 10 is small and the voltage signal output from the pressure sensor 41 is likely to contain noise in an area in which the brake pedal 3 starts to be depressed, a filtering process is performed on the sensor signal P_SC. Specifically, the filtering process can be, for example, a process using either a first-order low-pass filter, a moving average filter, or a median (median or intermediate value) filter.

Next, the target brake pressure setting unit 103 obtains an imaginary stroke amount St_est from a sensor signal P_SC_Flt after the filtering process by referring to the preset map data of the fluid pressure-stroke amount characteristic indicating a relationship between the fluid pressure P_MC generated inside the master cylinder 10 and the stroke amount St_rd of the input rod 5. The fluid pressure-stroke amount characteristic is the pre-obtained map data indicating a relationship between the stroke amount St_rd of the input rod 5 and the master cylinder pressure P_MC in the normal state in which the brake fluid appropriately returns from the stroke simulator device 40 into the master cylinder 10. That is, the target brake pressure setting unit 103 performs a process for converting the fluid pressure P_MC detected by the pressure sensor 41 into the stroke amount St_rd (imaginary stroke amount St_est) in the normal state.

As shown in FIG. 5, a relationship between the master cylinder pressure P_MC and the pedal force F_rd applied to the input rod 5 does not change regardless of the charge state of the brake fluid in the path from the master cylinder 10 to the stroke simulator device 40. Therefore, it is possible to convert the fluid pressure P_MC detected by the pressure sensor 41 into the stroke amount St_rd (imaginary stroke amount St_est) in the normal state by using the fluid pressure-stroke amount characteristic obtained on the basis of the pedal force-fluid pressure characteristic (FIG. 5) and the pedal force-stroke amount characteristic (FIG. 3) in the normal state.

Returning to FIG. 7, the target brake pressure setting unit 103 compares the obtained imaginary stroke amount St_est with a detection stroke amount St_act indicated by the sensor signal St_SC of the stroke sensor 9 and selects the larger stroke amount St_max. The target brake pressure setting unit 103 obtains the stroke base target brake pressure P_SB_tgt on the basis of the selected stroke amount St_max by referring to the preset map data of the stroke-brake pressure characteristic indicating a relationship between the stroke amount St_rd and the brake pressure P_SB to be generated.

By obtaining the stroke base target brake pressure P_SB_tgt in this way, the stroke base target brake pressure P_SB_tgt is set on the basis of the detection stroke amount St_act detected by the stroke sensor 9 in the normal state in which the brake fluid smoothly flows from the master cylinder 10 to the stroke simulator device 40 at a normal temperature or the like. On the other hand, when the temperature is low or the like, the movement of the brake fluid from the master cylinder 10 to the stroke simulator device 40 is hindered, and the stroke amount St_rd becomes smaller when the brake pedal 3 is depressed at the same pedal force F_rd, the stroke base target brake pressure P_SB_tgt is set on the basis of the imaginary stroke amount St_est obtained by converting the fluid pressure P_MC detected by the pressure sensor 41.

Then, the brake hydraulic pressure control device 100 compares the fluid pressure base target brake pressure P_PB_tgt with the stroke base target brake pressure P_SB_tgt and sets the larger one as the target brake pressure P_WC_tgt. Thus, when the temperature is low or the like, the movement of the brake fluid from the master cylinder 10 to the stroke simulator device 40 is hindered, the target brake pressure P_WC_tgt corresponding to the pedal force F_rd of the driver is set and the brake force requested by the driver can be generated.

Additionally, the method of obtaining the stroke base target brake pressure P_SB_tgt by calculation is not limited to the method of obtaining the stroke base target brake pressure P_SB_tgt on the basis of the larger stroke amount St_max in the imaginary stroke amount St_est and the detection stroke amount St_act. For example, the stroke base target brake pressure P_SB_tgt may be obtained on the basis of the average value of the imaginary stroke amount St_est and the detection stroke amount St_act. Alternatively, the stroke base target brake pressure P_SB_tgt may be obtained on the basis of the value obtained by weighting calculation using the imaginary stroke amount St_est and the detection stroke amount St_act.

4. Operation

Next, the operation of the brake system 1 according to this embodiment will be described with reference to FIG. 8. FIG. 8 shows a comparison of a relationship between the pedal force F_rd and the target brake pressure P_WC_tgt according to this embodiment with respect to a relationship between the pedal force F_rd and the target brake pressure P_WC_tgt of the reference example shown in FIG. 4.

In FIG. 8, a solid line X is the target brake pressure P_WC_tgt commonly used in the calculation process according to this embodiment and the calculation process of the reference example when the brake fluid smoothly flows from the master cylinder 10 to the stroke simulator device 40 at a normal temperature or the like. Further, a dashed line Y is the target brake pressure P_WC_tgt set in the calculation process of the reference example and shows a calculation process result in a state in which the movement of the brake fluid from the master cylinder 10 to the stroke simulator device 40 is hindered at a low temperature or the like. Further, a two-dot chain line Z is the calculation process result in the state in which the movement of the brake fluid from the master cylinder 10 to the stroke simulator device 40 is hindered at a low temperature or the like similarly to the dashed line Y and shows the target brake pressure P_WC_tgt set by the calculation process according to this embodiment.

As shown in FIG. 8, in the calculation process of the reference example, since the target brake pressure P_WC_tgt is set without considering a state in which the brake fluid does not easily move from the master cylinder 10 to the stroke simulator device 40, the target brake pressure P_WC_tgt set compared to the case of the operation of the brake pedal 3 at a normal temperature becomes small. On the other hand, in the calculation process according to this embodiment, since the target brake pressure P_WC_tgt is set by considering a state in which the brake fluid does not easily move from the master cylinder 10 to the stroke simulator device 40, it can be seen that the target brake pressure becomes closer to the target brake pressure P_WC_tgt set when the brake pedal 3 is operated at a normal temperature compared to the target brake pressure P_WC_tgt set by the calculation process of the reference example.

5. Effect

As described above, according to the brake system 1 of this embodiment, the brake hydraulic pressure control device 100 obtains the imaginary stroke amount St_est on the basis of the master cylinder pressure P_MC detected by the pressure sensor 41 using the preset map data of the fluid pressure-stroke amount characteristic and sets the target brake pressure P_WC_tgt on the basis of the imaginary stroke amount St_est. Accordingly, a desired brake pressure P_WC requested by the driver can be generated even when the brake pedal 3 is depressed and the brake fluid does not easily move from the master cylinder 10 to the stroke simulator device 40.

Further, according to the brake system 1 of this embodiment, a filtering process is performed on the sensor signal P_SC of the pressure sensor 41 in advance when obtaining the imaginary stroke amount St_est on the basis of the master cylinder pressure P_MC detected by the pressure sensor 41. Therefore, even when noise is contained in the sensor signal P_SC particularly in an area in which the brake pedal 3 starts to be depressed, the imaginary stroke amount St_est can be obtained by reducing the influence of the noise.

Additionally, as shown in FIG. 5, since the relationship between the master cylinder pressure P_MC and the pedal force F_rd applied to the input rod 5 does not change, it is conceived that the fluid pressure base target brake pressure P_PB_tgt can be directly set as the target brake pressure P_WC_tgt without calculating the stroke base target brake pressure P_SB_tgt. However, when the fluid pressure base target brake pressure P_PB_tgt is directly set as the target brake pressure P_WC_tgt, there is a risk that the brake pressure cannot be appropriately generated in any one of an area in which the brake pedal 3 starts to be depressed or an area in which the brake pedal 3 is deeply depressed.

Specifically, as described above, since the fluid pressure P_MC generated inside the master cylinder 10 is small and the voltage signal output from the pressure sensor 41 is likely to contain noise in an area in which the brake pedal 3 starts to be depressed, it is necessary to perform a filtering process on the sensor signal P_SC. When the filtering process is not performed, there is a risk that the target brake pressure P_WC_tgt set in an area in which the brake pedal 3 starts to be depressed becomes unstable. On the other hand, since the sensor signal St_SC of the pressure sensor 41 is smoothed when the filtering process is performed, there is a risk that an appropriate target brake pressure P_WC_tgt may not be set in a case in which sudden braking is required in a region in which the brake pedal 3 is deeply depressed.

On the other hand, the brake system 1 according to this embodiment is configured to perform a filtering process on the sensor signal St_SC of the pressure sensor 41 used when calculating the stroke base target brake pressure P_SB_tgt. Accordingly, the brake system 1 according to this embodiment can solve the problem in a case in which the brake fluid does not easily move from the master cylinder 10 to the stroke simulator device 40 and can generate an appropriate brake pressure in both an area in which the brake pedal 3 starts to be depressed and an area in which the brake pedal 3 is deeply depressed.

Although the preferred embodiments of the invention have been described in detail with reference to the accompanying drawings, the invention is not limited to such examples. It is clear that a person having ordinary knowledge in the technical field to which the invention belongs can conceive of various alterations or modifications within the scope of the technical idea described in the claims and it is understood that these also belong to the technical scope of the invention.

For example, in the above-described embodiment, an example has been described in which the brake fluid does not easily move from the master cylinder 10 to the stroke simulator device 40 at a low temperature, but the invention is not limited to an example of such a case. Although the master cylinder pressure shows the original increase in response to the brake pedal depression force, it is effective for any event in which the original stroke amount cannot be obtained for some reason. For example, when the brake pedal 3 is released after the brake pedal 3 is depressed and the fluid pressure is applied from the master cylinder 10 to the stroke simulator device 40 for some reason such as at low temperature, a phenomenon may occur in which it is difficult for the brake fluid to return from the stroke simulator device 40 to the master cylinder 10. When the brake fluid is not appropriately returned from the stroke simulator device 40 to the master cylinder 10, the brake fluid is replenished from the reservoir 31 into the master cylinder 10 due to the negative pressure generated inside the master cylinder 10. Even in such a case, the pressure inside the master cylinder 10 originally increases when the driver depresses the brake pedal 3 later, but the original stroke amount cannot be obtained. Even in such a state, according to the invention, the desired brake pressure P_WC requested by the driver can be generated.

Further, in the above-described embodiment, an example has been described in which the brake hydraulic pressure control device 100 compares the fluid pressure base target brake pressure P_PB_tgt with the stroke base target brake pressure P_SB_tgt and sets the larger one as the target brake pressure P_WC_tgt, but the invention is not limited to such an example. For example, the invention can be applied to a system that controls the brake pressure by only using the stroke base target brake pressure P_SB_tgt without using the fluid pressure base target brake pressure P_PB_tgt.

Further, the overall configuration of the brake system 1 described in the above-described embodiment is merely an example and the invention can be applied to various brake systems. For example, the fluid pressure control unit 60 which adjusts the brake pressure generated in each of the wheel cylinders 73*a* to 73*d* may include an electric motor pump instead of the piston cylinder unit 61 as a means for generating the brake pressure. Further, the fluid pressure control unit may be an actuator unit which is independently provided to correspond to each of the vehicle wheels 71*a* to 71*d* and generates the brake pressure in the wheel cylinders 73*a* to 73*d*.

REFERENCE SIGNS LIST

1: Brake system
3: Brake pedal
5: Input rod
9: Stroke sensor
10: Master cylinder
31: Reservoir
40: Stroke simulator device
41: Pressure sensor
43: Open/close control valve
50: Reaction force generation unit
55: Piston
57: Pressure chamber
60: Fluid pressure control unit
61: Piston cylinder unit
62: Piston
63: Electric motor
64: Cylinder
71*a*, 71*b*, 71*c*, 71*d*: Vehicle wheel
73*a*, 73*b*, 73*c*, 73*d*: Wheel cylinder
100: Brake hydraulic pressure control device
101: Processing unit
103: Target brake pressure setting unit
105: Brake pressure control unit 111: Storage unit

The invention claimed is:

1. A brake hydraulic pressure control device (100) for controlling a brake pressure (P_WC) by being applied to a brake system (1) comprising:
- a reservoir (31) which stores a brake fluid;
- a master cylinder (10) which includes a fluid pressure chamber (11, 13) connected to the reservoir (31) and generates a fluid pressure in accordance with the movement of an input rod (5) connected to a brake pedal (3);
- a stroke simulator device (40) which receives a fluid pressure (P_MC) generated by the master cylinder (10) and generates a reaction force to the brake pedal (3);
- a stroke sensor (9) which detects a stroke amount (St_act) of the input rod (5);
- a pressure sensor (41) which detects a pressure value (P_MC) of the fluid pressure generated by the master cylinder (10); and
- a fluid pressure control unit (60) which adjusts a brake pressure (P_WC) generated in a wheel cylinder (73*a* to 73*d*),
- wherein a derived stroke amount (St_est) of the input rod (5) is determined based on the pressure value (P_MC) detected by the pressure sensor (41) and the brake pressure (P_WC) is controlled based on the derived stroke amount (St_est).

2. The brake hydraulic pressure control device according to claim 1,
- wherein the brake hydraulic pressure control device (100) compares the derived stroke amount (St_est) with a detection stroke amount (St_act) detected by the stroke sensor (9) and determines a stroke amount (St_max) used to control the brake pressure (P_WC).

3. The brake hydraulic pressure control device according to claim 2,
- wherein the brake hydraulic pressure control device (100) obtains a stroke base target brake pressure (P_SB_tgt) based on a stroke amount (St_max) used to control the brake pressure (P_WC) determined by comparing the derived stroke amount (St_est) with the detection stroke amount (St_act) using preset data of a stroke-brake pressure characteristic indicating a relationship between a target brake pressure (P_SB) and a stroke amount (St_rd) of the input rod (5), obtains a fluid pressure base target brake pressure (P_PB_tgt) based on the pressure value (P_MC) detected by the pressure sensor (41) using preset data of a fluid pressure-brake pressure characteristic indicating a relationship between a target brake pressure (P_PB) and the fluid pressure (P_MC), and controls the brake pressure (P_WC) based on the larger value (P_WC_tgt) of the stroke base target brake pressure (P_SB_tgt) or the fluid pressure base target brake pressure (P_PB_tgt).

4. The brake hydraulic pressure control device according to claim 1, wherein the brake hydraulic pressure control device (100) calculates the derived stroke amount (St_est) after performing a filtering process on the pressure value (P_MC) detected by the pressure sensor (41).

5. A brake system (1) comprising:

a reservoir (31) which stores a brake fluid;

a master cylinder (10) which includes a fluid pressure chamber (11, 13) connected to the reservoir (31) and generates a fluid pressure in accordance with the movement of an input rod (5) connected to a brake pedal (3);

a stroke simulator device (40) which receives a fluid pressure (P_MC) generated by the master cylinder (10) and generates a reaction force to the brake pedal (3);

a stroke sensor (9) which detects a stroke amount (St_act) of the input rod (5);

a pressure sensor (41) which detects a pressure value (P_MC) of the fluid pressure generated by the master cylinder (10);

a fluid pressure control unit (60) which adjusts a brake pressure (P_WC) generated in a wheel cylinder (73*a* to 73*d*); and a brake hydraulic pressure control device (100) which controls the brake pressure (P_WC), wherein the brake hydraulic pressure control device (100) determines a derived stroke amount (St_est) of the input rod (5) based on the pressure value (P_MC) detected by the pressure sensor (41) and controls the brake pressure (P_WC) based on the derived stroke amount (St_est).

* * * * *